US009645717B2

(12) United States Patent
Kadishay et al.

(10) Patent No.: US 9,645,717 B2
(45) Date of Patent: May 9, 2017

(54) MANAGING A SELECTION MODE FOR PRESENTED CONTENT

(75) Inventors: Yotam Kadishay, Tel-Aviv (IL); Fabian Nirman, Ahsdod (IL); Nimrod Barak, Tel Aviv (IL); Dvir Cooper, Ashqelon (IL)

(73) Assignee: SAP Portals Israel Ltd., Ra'anana (IL)

( * ) Notice: Subject to any disclaimer, the term of this patent is extended or adjusted under 35 U.S.C. 154(b) by 383 days.

(21) Appl. No.: 13/603,600

(22) Filed: Sep. 5, 2012

(65) Prior Publication Data
US 2014/0068509 A1    Mar. 6, 2014

(51) Int. Cl.
G06F 3/048    (2013.01)
G06F 3/0484    (2013.01)
G06F 3/0488    (2013.01)

(52) U.S. Cl.
CPC ...... *G06F 3/04842* (2013.01); *G06F 3/04883* (2013.01)

(58) Field of Classification Search
CPC .................................. G06F 3/041; G06F 3/048
See application file for complete search history.

(56) References Cited

U.S. PATENT DOCUMENTS

| 6,664,991 | B1* | 12/2003 | Chew et al. ................. 715/863 |
| 8,028,251 | B2* | 9/2011 | Park et al. .................... 715/863 |
| 8,572,509 | B2* | 10/2013 | Gobeil .......................... 715/834 |
| 2005/0289109 | A1* | 12/2005 | Arrouye et al. ................. 707/1 |
| 2008/0178101 | A1 | 7/2008 | Rode et al. |
| 2009/0172572 | A1 | 7/2009 | Behrens et al. |
| 2009/0204577 | A1 | 8/2009 | Mayer-Ullmann et al. |
| 2009/0271733 | A1* | 10/2009 | Noma ............................ 715/784 |
| 2010/0100854 | A1* | 4/2010 | Russell et al. ................ 715/863 |
| 2011/0083104 | A1* | 4/2011 | Minton ......................... 715/815 |
| 2011/0231796 | A1* | 9/2011 | Vigil ................... G06F 3/04883 715/810 |
| 2011/0244924 | A1* | 10/2011 | Jung et al. .................... 455/566 |
| 2011/0283188 | A1 | 11/2011 | Farrenkopf et al. |
| 2012/0130815 | A1* | 5/2012 | Steelberg et al. .......... 705/14.55 |

(Continued)

OTHER PUBLICATIONS

'Wikipedia' [online]. "Tablet Computer," Aug. 31, 2011, [retrieved on Sep. 5, 2012]. Retrieved from the internet: <URL: http://en.wikipedia.org/w/index.php?title=Tablet_computer&oldid=447607662>. 8 pages.

(Continued)

*Primary Examiner* — Xuyang Xia
(74) *Attorney, Agent, or Firm* — Fish & Richardson P.C.

(57) ABSTRACT

Content and a selection activation element are presented on a touchscreen. First input generated by a user holding the selection activation element on the touchscreen is received. While the user is holding the selection activation element, a selection mode is activated. While the user is holding the selection activation element, second input is received generated by the user selecting at least part of the content according to the selection mode. The user releases the selection activation element. The selection mode is deactivated and a contextual menu with one or more user-selectable operation identifiers for the selected part of the content is presented. Third input is received generated by the user selecting at least one of the user-selectable operation identifiers. An operation corresponding to the at least one selected operation identifier is performed.

22 Claims, 15 Drawing Sheets

(56) References Cited

U.S. PATENT DOCUMENTS

| | | | |
|---|---|---|---|
| 2012/0233545 A1* | 9/2012 | Ikeda et al. | 715/702 |
| 2012/0306772 A1* | 12/2012 | Tan et al. | 345/173 |
| 2013/0019182 A1* | 1/2013 | Gil et al. | 715/738 |
| 2013/0085855 A1* | 4/2013 | Dyor | G06F 3/017 705/14.55 |
| 2013/0227490 A1* | 8/2013 | Thorsander | G06F 3/04883 715/841 |
| 2014/0173473 A1* | 6/2014 | Hicks | 715/764 |
| 2014/0173483 A1* | 6/2014 | Hicks | 715/769 |

OTHER PUBLICATIONS

'Wikipedia' [online] "Touchscreen," Sep. 2, 2011, [retrieved on Sep. 5, 2012]. Retrieved from the internet: <URL: http://en.wikipedia.org/w/index.php?title=Touchscreen&oldid=448076388>. 11 pages.

* cited by examiner

National Edition News of the Day July 16, 2012

Train Shortage Causes Delays in the North

Associate Images

By PAMELA JOURNALIST

NORTH SPRINGFIELD --- At least twenty long-distance trains remained out of commission on Sunday night following extensive repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal "...ke it took forever ...t of Springfield this ...d Joseph Traveler, ...ly boards the 6.55 Lightning Express and expects to arrive at his destination, 58 miles up the tracks, less than an hour later. Friday morning, however, was a different story. More

Biotech Industry Hurt By Safety Rules

By Joe Writer and Liz Scriver

The new safety rules for the development and manufacture of biomedics are stifling growth and job creation, said a lobby group representing many of the nation's biotech companies.

The rules were implemented earlier this month by the Food and Drug Administration, as a direct result of the congressional hearings in December. More United Photos

Picture This: Neverending Sunshine

By Natalie Techy

A private company has released extensive plans for launching satellites bearing giant mirrors into space and use them to reflect sunlight onto just about any country, region, city or even neighborhood that so desires, for a fee. This could essentially eliminate nighttime darkness as we know it.

"Think about it," said Jonathan Resource, the company's CEO and Chairman, "by suffering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

Stock Images his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

FIG. 2B

National Edition News of the Day July 16, 2012

Train Shortage Causes Delays in the North

B ~~Biotech Industry Hurt By Safety Risk~~ C
— 210A
— 212

By Joe Writer and Liz Scriver

The new safety rules for the development and manufacture of biomedics are stifling growth and job creation, said a lobby group representing many of the nation's biotech companies.

The rules were implemented earlier this month by the Food and Drug Administration, as a direct result of the congressional hearings in December. More

210

United Photos

Associate Images

By PAMELA JOURNALIST

NORTH SPRINGFIELD — At least twenty long-distance trains remained out of commission on Sunday night following extensive repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal

206

A ...orever ...ield this ...aveler, ...he 6.55

Lightning Express and expects to arrive at his destination, 58 miles up the tracks, less than an hour later. Friday morning, however, was a different story. More

Picture This: Neverending Sunshine

By Natalie Techy

A private company has released extensive plans for launching satellites bearing giant mirrors into space and use them to reflect sunlight onto just about any country, region, city or even neighborhood that so desires, for a fee. This could essentially eliminate nighttime darkness as we know it.

"Think about it," said Jonathan Resource, the company's CEO and Chairman, "by suffering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

Stock Images his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

FIG. 2D

News of the Day

National Edition — July 16, 2012

Train Shortage Causes Delays in the North

Associate Images
By PAMELA JOURNALIST

NORTH SPRINGFIELD — At least twenty long-distance trains remained out of commission on Sunday night following extensive repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal ...rever ...eld this ...aveler, ...he 6.55 Lightning Express and expects to arrive at his destination, 58 miles up the tracks, less than an hour later. Friday morning, however, was a different story. More

Biotech Industry Hurt By Safety Rules

By Joe Writer and Liz Scriver

The new safety rules for the development and manufacture of biomedis are stifling growth and job creation, said a lobby group representing many of the nation's biotech companies.

The rules were implemented earlier this month by the Food and Drug Administration, as a direct result of the congressional hearings in December. More

Picture This: Neverending Sunshine

By Natalie Techy

A private company has released extensive plans for launching satellites bearing giant mirrors into space and use them to reflect sunlight onto just about any country, region, city or even neighborhood that so desires for a fee. This could essentially eliminate nighttime darkness as we know it.

"Think about it," said Jonathan Resource, the company's CEO and Chairman, "By offering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

United Photos

Stock Images his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

FIG. 2F

News of the Day

National Edition     July 16, 2012

Train Shortage Causes Delays in the North

Associate Images

By PAMELA JOURNALIST

NORTH SPRINGFIELD --- At least twenty long-distance trains remained out of commission on Sunday night following extensive repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal...

(A) ...orever ...ield this ...aveler, ...ne 6:55 Lightning Express and expects to arrive at his destination, 58 miles up the tracks, less than an hour later. Friday morning, however, was a different story. More

Biotech Industry Hurt By Safety Rules — 222

By Joe Writer and Liz Scriver

The new safety rules for the development and manufacture of biomedics are stifling growth and job creation, said a lobby group representing many of the nation's biotech companies.

The rules were implemented earlier this month by the Food and Drug Administration, as a direct result of the congressional hearings in December. More

United Photos

Picture This: Neverending Sunshine

224   By Natalie Techy

A private company has released extensive plans for launching satellites bearing giant mirrors into space and use them to reflect sunlight onto just about any country, region, city or even neighborhood that so desires, for a fee. This could essentially eliminate nighttime darkness as we know it.

"Think about it," said Jonathan Resource, the company's CEO and Chairman, "by suffering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

Stock Images — 226 his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

News of the Day

National Edition — July 16, 2012

Train Shortage Causes Delays in the North

Associate Images
By PAMELA JOURNALIST

NORTH SPRINGFIELD --- At least twenty long-distance trains remained out of commission Sunday night following repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal schedule.

"It seemed like it took forever just to get out of Springfield this morning," said Joseph Traveler, who normally boards the 6.55 Lightning Express and expects to arrive at his destination, 58 miles up the tracks, less than an hour later. Friday morning, however, was a different story. More

Biotech Industry Hurt By Safety Rules

By Joe Writer and Liz Scriver

The new safety rules for the development and manufacture of biomedics are stifling growth and job creation, said a lobby group representing many of the nation's biotech companies.

The rules were implemented earlier this month by the Food and Drug Administration, as a direct result of the congressional hearings in December. More United Photos

Picture This: Neverending Sunshine

*Improve selection* satellites bearing giant mirrors into space and use them to reflect sunlight onto just about any country, region, city or even neighborhood that so desires, for a fee. This could essentially eliminate nighttime darkness as we know it.

"Think about it," said Jonathan Resource, the company's CEO and Chairman, "by suffering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

Stock Images his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

FIG. 2J

National Edition News of the Day July 16, 2012

Train Shortage Causes Delays in the North

236

Associate Images

By PAMELA JOURNALIST

NORTH SPRINGFIELD --- At least twenty long-distance trains remained out of commission on Sunday night following extensive repairs and renovations prompted by passenger complaints and a general urge to raise the standard of the nation's railway system.

Officials in the affected area acknowledged the impact on commuters and goods distribution, but emphasized that the negative effects are expected to recede within about a week, when the majority of the work is scheduled to be complete and the trains can resume running according to their normal schedule.

"It seemed like it took forever just to get out of Springfield this morning," said Joseph Traveler, who normally boards the 6:55 Lightning Express and expects to arrive at his destination, 58 miles up the tracks, less than an hour later. Friday morning, however, was a different story. More

Biotech Industry Hurt By Safety Rules

By Joe Writer and Liz Scriver

The new safety rules for the development and manufacture of biomedics are stifling growth and job creation, said a lobby group representing many of the nation's biotech companies.

The rules were implemented earlier this month by the Food and Drug Administration, as a direct result of the congressional hearings in December. More United Photos

210

Picture This: Neverending Sunshine

By Natalie Techy

A private company has released extensive plans for launching satellites bearing giant mirrors into space and use them to reflect sunlight onto just about any country, region, city or even neighborhood that so desires, for a fee. This could essentially eliminate nighttime darkness as we know it.

"Think about it," said Jonathan Resource, the company's CEO and Chairman, "by suffering through the lack of daylight during the night hours we're really just using half of our total capacity as a society. With this new technology, you will have on-demand sunlight at any location you choose. Perfect for farmers, road construction workers, the transportation industry, you name it."

Mr. Resource stressed the unique competitive position

Stock Images his company, OnDemand Solar Solutions, LLC, will enjoy thanks to its status as the pioneer in this new, potentially lucrative, field.

The cost of purchasing his company's services have not been released, but they are expected to vary from country to country and also based on the size of the area on Earth that is being illuminated.

"Ideas of this type pop up from time to time," said Professor Sol McIntosh of Richmond University. "But this is the first time I've seen it survive past one round of financing." More

FIG. 2K

MANAGING A SELECTION MODE FOR PRESENTED CONTENT

BACKGROUND

Users of mobile devices sometimes wish to highlight and select content from web pages or other displayed material and copy it for some usage scenario. Due to the size of these devices and the nature of the touchscreen interface, the flexibility and usability of such selections can be limited.

SUMMARY

In a first aspect, a computer-implemented method for managing a selection mode for presented content includes: presenting, on a touchscreen of a device, content and a selection activation element; receiving, using the touchscreen, first input generated by a user holding the selection activation element on the touchscreen; in response to the first input, and while the user is holding the selection activation element, activating a selection mode on the device; after activation of the selection mode, and while the user is holding the selection activation element, receiving second input generated by the user selecting at least part of the content on the touchscreen according to the selection mode; determining that the user releases the selection activation element on the touchscreen; in response to the determination, deactivating the selection mode and presenting on the touchscreen a contextual menu with one or more user-selectable operation identifiers for the selected part of the content; receiving third input generated by the user selecting at least one of the user-selectable operation identifiers on the touchscreen; and in response to the third input, performing an operation corresponding to the at least one selected operation identifier.

In a second aspect, a computer program product is embodied in a non-transitory computer-readable storage medium and includes instructions that when executed by a processor perform a method for managing a selection mode for presented content. The method includes: presenting, on a touchscreen of a device, content and a selection activation element; receiving, using the touchscreen, first input generated by a user holding the selection activation element on the touchscreen; in response to the first input, and while the user is holding the selection activation element, activating a selection mode on the device; after activation of the selection mode, and while the user is holding the selection activation element, receiving second input generated by the user selecting at least part of the content on the touchscreen according to the selection mode; determining that the user releases the selection activation element on the touchscreen; in response to the determination, deactivating the selection mode and presenting on the touchscreen a contextual menu with one or more user-selectable operation identifiers for the selected part of the content; receiving third input generated by the user selecting at least one of the user-selectable operation identifiers on the touchscreen; and in response to the third input, performing an operation corresponding to the at least one selected operation identifier.

In a third aspect, a system includes: one or more processors; and a computer program product comprising instructions that when executed perform a method. The method includes: presenting, on a touchscreen of a device, content and a selection activation element; receiving, using the touchscreen, first input generated by a user holding the selection activation element on the touchscreen; in response to the first input, and while the user is holding the selection activation element, activating a selection mode on the device; after activation of the selection mode, and while the user is holding the selection activation element, receiving second input generated by the user selecting at least part of the content on the touchscreen according to the selection mode; determining that the user releases the selection activation element on the touchscreen; in response to the determination, deactivating the selection mode and presenting on the touchscreen a contextual menu with one or more user-selectable operation identifiers for the selected part of the content; receiving third input generated by the user selecting at least one of the user-selectable operation identifiers on the touchscreen; and in response to the third input, performing an operation corresponding to the at least one selected operation identifier.

Implementations can include any or all of the following features. The selection activation element is presented in a margin of the touchscreen. The user swipes the selection activation element from an inactive state to an active state where the selection activation element is larger. The selection activation element is presented on the touchscreen in a location reachable with one hand that is holding the device, and the user generates the second input using the other hand. The second input corresponds to multiple portions of the content selected by the user while holding the selection activation element, and the operation comprises one or more functions performed with regard to the multiple portions. The second input includes at least one of: the user swiping a finger along the part of the content; the user swiping the finger diagonally across the part of the content; the user swiping the finger to create a shape on the touchscreen that at least partly includes the part of the content; and the user places two fingers on the touchscreen, where the part of the content is defined by a block wherein the two fingers spans a diagonal of the block. The operation identifiers for the selected part of the content are determined based on at least one of: a context of the part of the content; meta data of the part of the content; a type of the part of the content; an application that presents the part of the content; and a role of the user. The content includes an article and the meta data includes a tag that specifies an author name for the content, and the operation comprises performing a search using the content and the author name. The operation is defined in a program, and the method further includes detecting that the program is available to the user, wherein the operation is performed in response to the detection. At least one of the operation identifiers corresponds to modifying the selection of the at least part of the content such that a larger or smaller selection is made. Before the contextual menu is presented the method further includes detecting that the selected at least part of the content is part of a unit within the content, wherein modifying the selection comprises expanding the selection to include the unit.

Implementations can provide any or all of the following advantages. The number and complexity of operations that can be performed on selected content on a touchscreen device can be increased. A selection mechanism can be provided that is convenient to use while holding the touchscreen device.

The details of one or more implementations are set forth in the accompanying drawings and the description below. Other features and advantages will be apparent from the description and drawings, and from the claims.

DESCRIPTION OF DRAWINGS

FIGS. 2A-K show examples of views that can be presented.

Like reference symbols in the various drawings indicate like elements.

DETAILED DESCRIPTION

This document describes systems and techniques that manage a selection mode. When content is presented on a touchscreen device, such as a tablet or a smartphone, the user can select and hold a particular element shown on the touchscreen device to activate the selection mode. The selection mode remains active as long as the user does not release the element, and allows the user to select one or more portions of the presented content. When the element is released, the user is presented with one or more choices for the operation(s) to perform on the selected portion.

Figure 1:
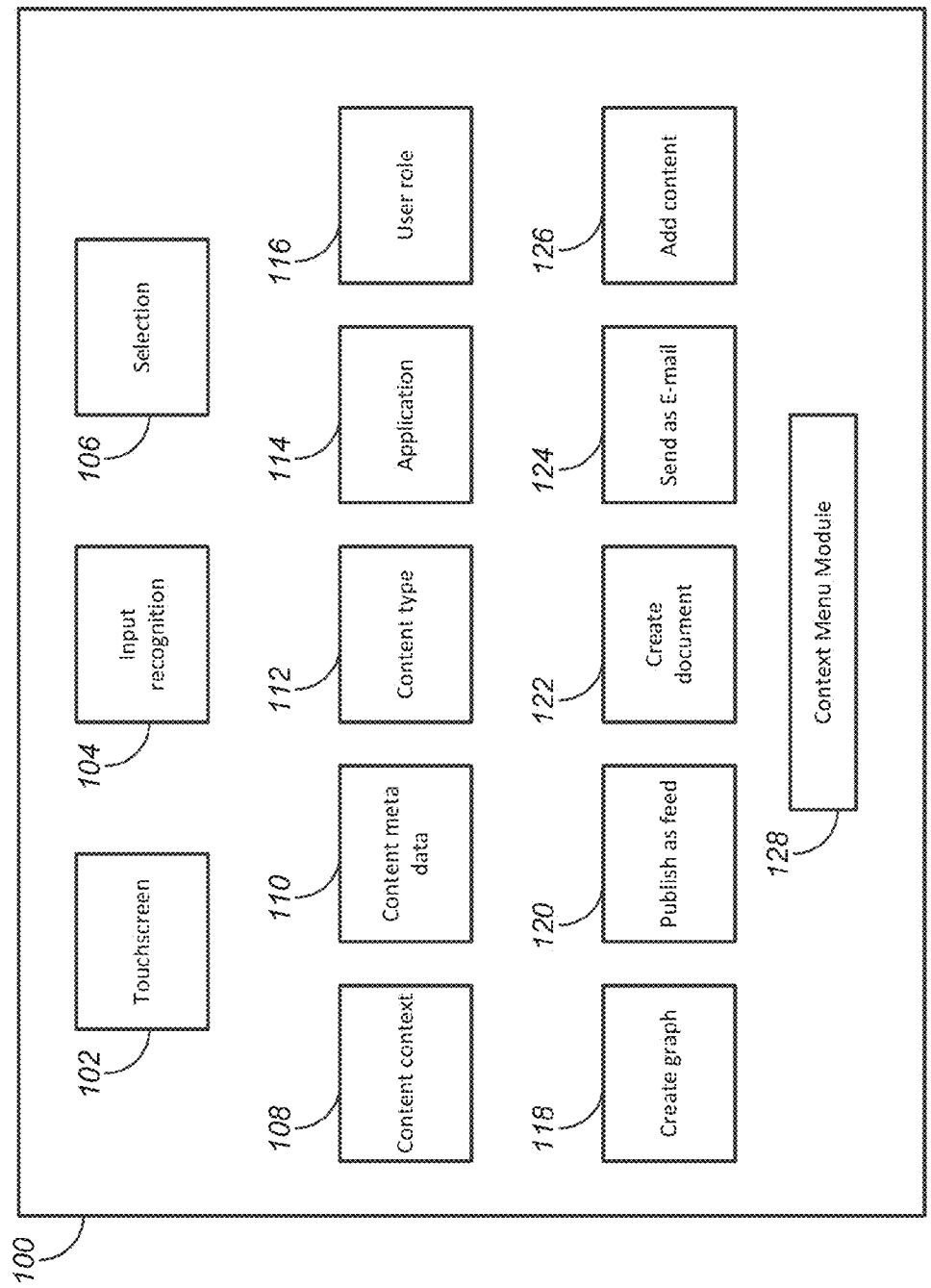
FIG. 1 shows an example of a system that can manage a selection mode for presented content.

FIG. 1 shows an example of a system 100 that can manage a selection mode for presented content. In some implementations, the system 100 is a device that has a touchscreen. For example, the device can be a tablet computer, a smartphone or any other device with a touchscreen.

The system 100 includes a touchscreen component 102. In some implementations, the touchscreen component 102 detects that the touchscreen is being used and produces an event or one or more digital messages or other signals. For example, and without limitation, the touchscreen component can generate different input signals depending on whether the user swipes a finger along displayed content (e.g., text), swipes the finger diagonally across displayed content (e.g., a block of text and/or an image), swipes the finger to create an arbitrary shape on the touchscreen (e.g., an enclosure); or defines a rectangle surrounding the displayed content by placing fingers at diametrically opposing corners thereof.

The system 100 includes an input recognition component 104. In some implementations, the input recognition component can detect and recognize certain inputs from the touchscreen and distinguish them from other inputs. For example, recognized inputs can include, but are not limited to, the holding of a selection activation element on the touchscreen, and the selection of an arbitrary amount and/or type of displayed content.

The system 100 includes a selection component 106. In some implementations, the selection component is operative when a particular selection mode is activated. For example, the selection component can provide for user selection of displayed content by touchscreen operation, without inadvertent activation of on-screen hyperlinks or other navigation mechanisms.

When the user has selected some content, the system 100 will decide to offer one or more operations for the user to choose between, the operation(s) to be performed on or with regard to the selected content. This decision can be based on one or more categories of information, such as those that are determined by components 108-116. In some implementations, the content context component 108 determines a context of the content that has been, or is being, selected. In some implementations, the content meta data component 110 determines meta data associated with the selected content. In some implementations, the content type component 112 determines a type of the selected content. In some implementations, the application component 114 determines which application presents, or otherwise handles, the selected content. In some implementations, the user role component 116 determines which role the user has been assigned in the system.

The operations that the system decides to offer the user when the content has been selected can include any or all of the operations available in the system, including, but not limited to, operations 118-126. In some implementations, the system includes a context menu module 128 that is configured to select, based on selected content and its context, the function(s) or operation(s) that should be made available to the user in that situation.

The context menu module 128 can have at its disposal any or all functions or operations available in the system, and choose among them when populating a context menu. In some implementations, the create graph operation 118 can create a graph or other visual presentation from the selected content. For example, when several rows and/or columns of table data are selected, the component 118 can create a chart or other visualization thereof. In some implementations, the publish-as-feed operation 120 can publish the selected content in one or more feeds. For example, if the user has a social feed mechanism assigned to his or her account in the system, the content can be published using such feed(s). In some implementations, the create document operation 122 can generate one or more documents from the selected content. For example, a portable document format (pdf) document can be created. In some implementations, the send-as-email operation 124 can generate one or more emails from the selected content. For example, the operation 122 and/or 124 can be offered to the user when the selected content includes complex information (e.g., a combination of text, tables, images, etc.) In some implementations, the add content operation 126 can suggest that one or more other content portions also be selected. For example, if the user selects content that is related to a non-selected image or table, the operation 126 can propose to the user that such non-selected content should be added to the selection.

Figure 2A:

FIGS. 2A-K show examples of views that can be presented. FIG. 2A shows a device 200, such as a tablet or smartphone, which has a touchscreen 202 where content can be presented. Here, a page 204 is currently presented on the touchscreen 202. In this example, the page 204 includes news content in form of multiple articles.

A selection activation element 206 is presented on the touchscreen 202. In some implementations, the selection activation element 206 is presented in the margin of the touchscreen. For example, the element can be placed at, or in the immediate vicinity of, the border surrounding the touchscreen. This placement can make the element reachable with one hand by which the user is holding the device (e.g., so that the element is reached with the thumb), and the user can then select content using the other hand. In some implementations, the user can choose where on the touchscreen the element 206 should be located. For example, a left-handed user may prefer to have the element toward the right side of the touch screen, and vice versa for a right-handed user.

The selection activation element 206 is currently not activated. In some implementations, that corresponds to a collapsed state of the element on the touch screen.

When the user activates the element 206, its appearance can change. In some implementations, the element 206 can become larger, as schematically indicated by an arrow 208. For example, the user can enlarge the element by swiping his or her finger in the general direction of the arrow 208.

Figure 2C:

FIG. 2C shows the selection activation element 206 in its expanded state. In some implementations, the user creates the expanded state by swiping his or her finger until the element reaches its maximum size, and then holding the finger in that position. This is schematically indicated by the letter "A" in the illustration, corresponding to a point where the user's fingertip may be positioned while holding the element in its expanded, or active, state.

The activation of the element 206 can be detected by the input recognizer 104 (FIG. 1), which can cause the system to activate a selection mode. Examples involving the selection mode will now be described.

In FIG. 2D, while holding the selection activation element 206, the user swipes his or her finger along a headline 210A at the top of an article 210. This is schematically indicated by the user placing the fingertip at the letter "B" in the illustration, swiping the fingertip along an arrow 212, and removing the fingertip from the touchscreen at the letter "C." The user can select an arbitrary amount of character information by swiping along the line, here the sentence "Biotech industry hurt by safety rules." The swiping can be done in any direction along the characters. In short, by holding the element 206 activated (at "A") while swiping a finger over content (from "B" to "C") the user can conveniently select a portion of the presented content. A right-handed user can perform the above operations by placing the left-hand thumb at "A" and swiping a finger of the right hand from "B" to "C." A left-handed user, in turn, may choose to have the selection activation element in the opposite margin of the touchscreen, and such a user can then perform the above operations by placing the right-hand thumb at "A" and swiping a finger of the left hand from "B" to "C."

Figure 2E:
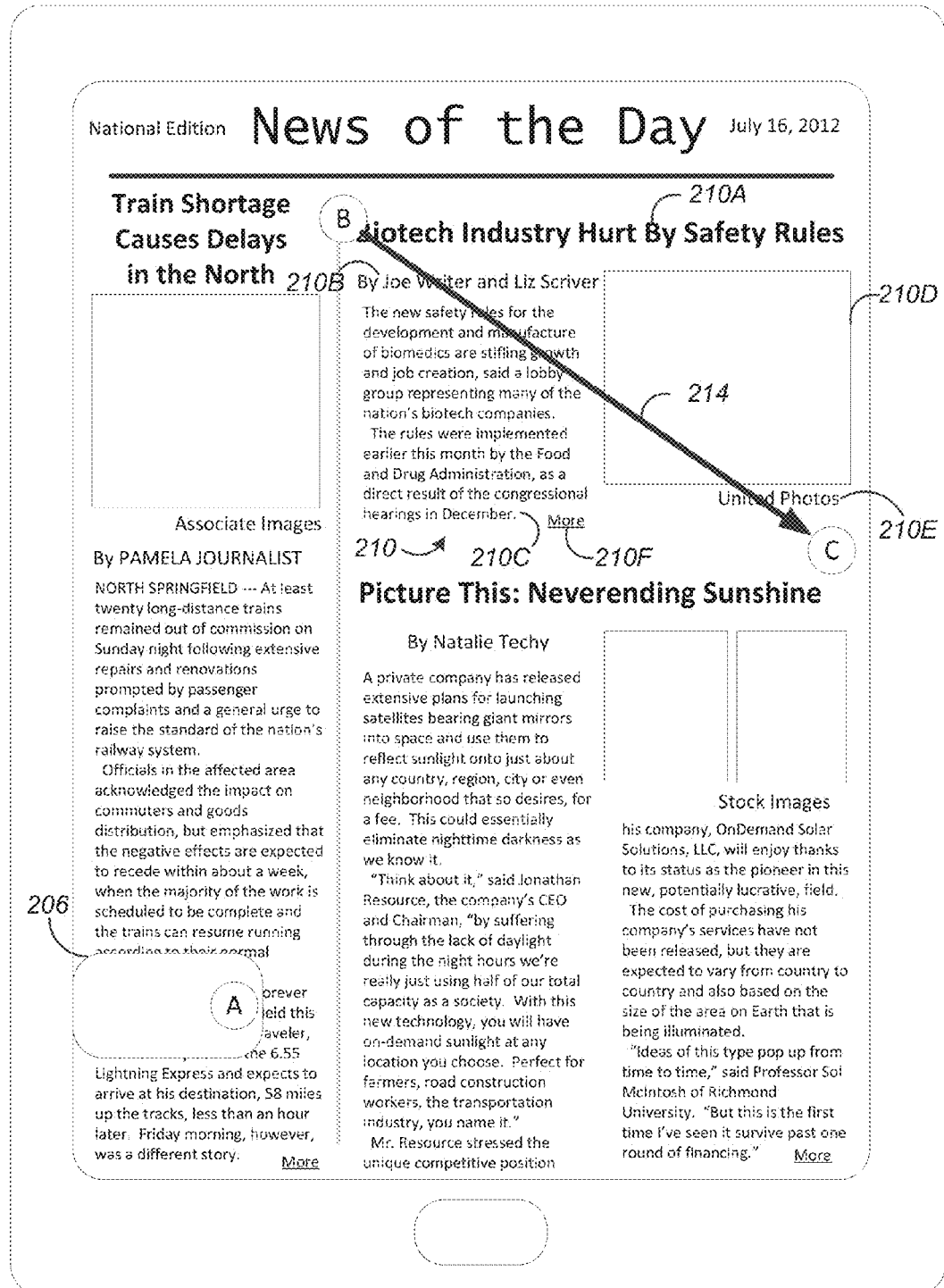

Another example of selecting content is shown in FIG. 2E. Here, while holding the selection activation element 206, the user swipes his or her finger across the article 210, as indicated by an arrow 214. In some implementations, this causes selection of all content covered by the swipe. For example, the selected content may here include: the headline 210A, a byline 210B, copy 210C, an image 210D, an image attribution 210E, and a link 210F.

Content can be selected based on any shape. FIG. 2F shows an example where the user swipes his or her finger, while holding the selection activation element 206, in an arbitrary shape as indicated by arrow 216. In some implementations, only content that is entirely enclosed by the swipe will be part of the selection. For example, the link 210F and a byline 218B of another article 218 would then be included in the selection, whereas other content, such as copy 218C of the article 218 that is not entirely enclosed, would not be part of the selection. In other implementations, all content that is covered by the user's swipe is included in the selection regardless of whether it is entirely includes. For example, the link 210F, a heading 218A, the byline 218B and the copy 218C could then be included in the selection.

Figure 2G:
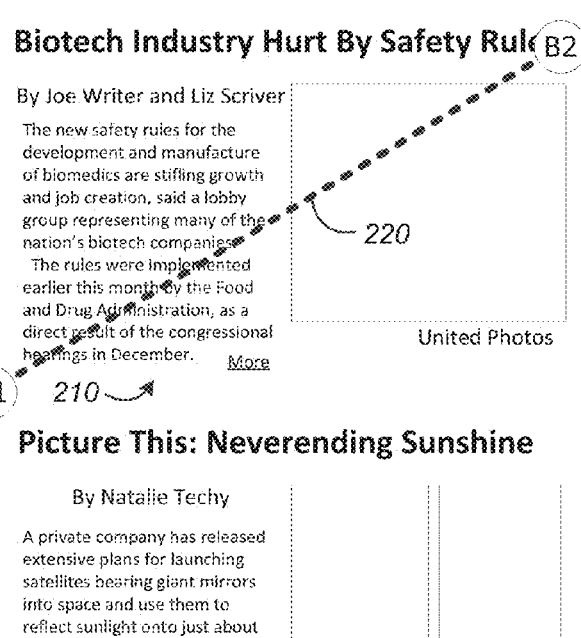

Content can be selected by ways other than swiping. FIG. 2G shows an example where, while holding the selection activation element 206, the user places one fingertip (e.g., of the thumb) at "B1" and another fingertip (e.g., of the index finger) at "B2" in the illustration. This defines a diagonal 220 of a rectangle. That is, the defined rectangle can be the basis for the content selection. For example, the entire article 210 can be selected based on this placement of the user's fingertips.

More than one selection within the presented content can be made. FIG. 2H shows an example where, while holding the element 206 activated, the user has selected areas 222, 224 and 226. The selection can be indicated by highlighting the selected area(s). For example, here the selections are indicated by cross-hatching inside a frame that encloses the selected content. In some implementations, more than one selection technique can be used on the same presented content. For example, the area 222 was here selected by swiping a finger diagonally across the content (e.g., similar to FIG. 2E); the area 224 was selected by using two fingertips to define the diagonal of an enclosing frame (e.g., similar to FIG. 2G); and the area 226 was selected by swiping a finger along a character string (e.g., similar to FIG. 2D).

When the user has finished making the selection(s), the user releases the element 206 to exit the selection mode. FIG. 2I shows an example where only one area had been selected, namely the area 222. The area may have been selected using any of the selection techniques described herein. When the user releases the element 206, it assumes its earlier collapsed state (also illustrated in FIG. 2A). Moreover, the release causes the system to deactivate the selection mode. For example, deactivating the selection mode means that if the user thereafter performs any of the selection techniques described here (e.g., swiping from "B" to "C"), the content is not selected as it would be in the selection mode. In some implementations, the user's action (e.g., swiping a finger) may then trigger another function in the system. In such situations, the swipe can scroll the displayed screen, flip a virtual page, or relocate one or more objects, to name just a few examples.

The deactivation of the selection mode when one or more content portions have been selected (here, the area 222) causes a menu 228 to be presented on the touchscreen. The menu 228 includes one or more operation identifiers 230A-C that the user can select to perform operation(s) on the selected content. Here, the identifier 230A corresponds to exporting the selected content as a pdf; the identifier 230B corresponds to sending the selected content as an email; and the identifier 230C corresponds to publishing the selected content as a feed. Other operations can be provided by corresponding identifiers.

The menu 228 is contextual, meaning that the operation identifiers 230A-C are selected based on the current situation. In some implementations, the context of the selected content can be taken into account when choosing the identifiers 230A-C. For example, the content context component 108 (FIG. 1) can determine that the area 222 is selected on the front page of an online newspaper. In some implementations, meta data of the selected content can be taken into account when choosing the identifiers. For example, the content meta data component 110 (FIG. 1) can determine the meta data of the selected area 222. In some implementations, a type of the selected content can be taken into account when choosing the identifiers. For example, the content type component 112 (FIG. 1) can determine a type of the selected area 222. In some implementations, one or more applications can be taken into account when choosing the identifiers. For example, the application component 114 (FIG. 1) can determine the application(s) involved in presenting or otherwise generating the selected area 222. In some implementations, a role of the user can be taken into account when choosing the identifiers. For example, the user role component 116 (FIG. 1) can determine the role of the user who selects the area 222. Other information can be taken into account in some implementations.

When the user selects any of the operation identifiers 230A-C the system performs the corresponding operation(s). In some implementations, the system also removes the menu 228 and the highlighting of the area 222. For example, this allows the user to continue viewing or otherwise using the content presented on the touchscreen, such as by making a new selection of some other content.

After the user selects some content, the system can suggest one or more improved selections to the user. FIG. 2J shows an example where the user has made a selection 232, such as by any of the selection techniques mentioned above. Here, the selection 232 includes some, but not all, of the content in the article 210. Particularly, the byline 210B and the image 210D are inside the selection, the title 210A, the image attribution 210E and the link 210F are outside the selection, and the copy 210C is partially inside the selection.

In some implementations, a suggestion can then be made to modify the selection to include the entire article (and/or any entire unit in the content that has been detected as partially selected.) For example, this can be done by recognizing tags and/or other identifiers in the underlying document that defines certain content to be part of the same article. As a result, the menu 228 can include at least one operation identifier 234 that corresponds to modifying the selection, such as by enlarging or diminishing the selection. For example, if the user selects the operation identifier 234 this can trigger the system to expand the selection 232 so that at least also the image attribution 210E and the link 210F are included in the selection. FIG. 2K shows an example where a selection 236 is made as a result of an input requesting an improvement of the selection. If the selection 232 (FIG. 2J) initially did not encompass the copy 210C, because the copy was only partially inside the selection, then the operation identifier 234 can also cause the system to include the copy 210C in the selection. Accordingly, the selection 236 includes the entire article 210 in this example. After the selection 236 has been made, the system can present a context menu that includes one or more operations that can be performed on the content of the selection 236 (i.e., in this example, on the article as a whole.)

Figure 3:
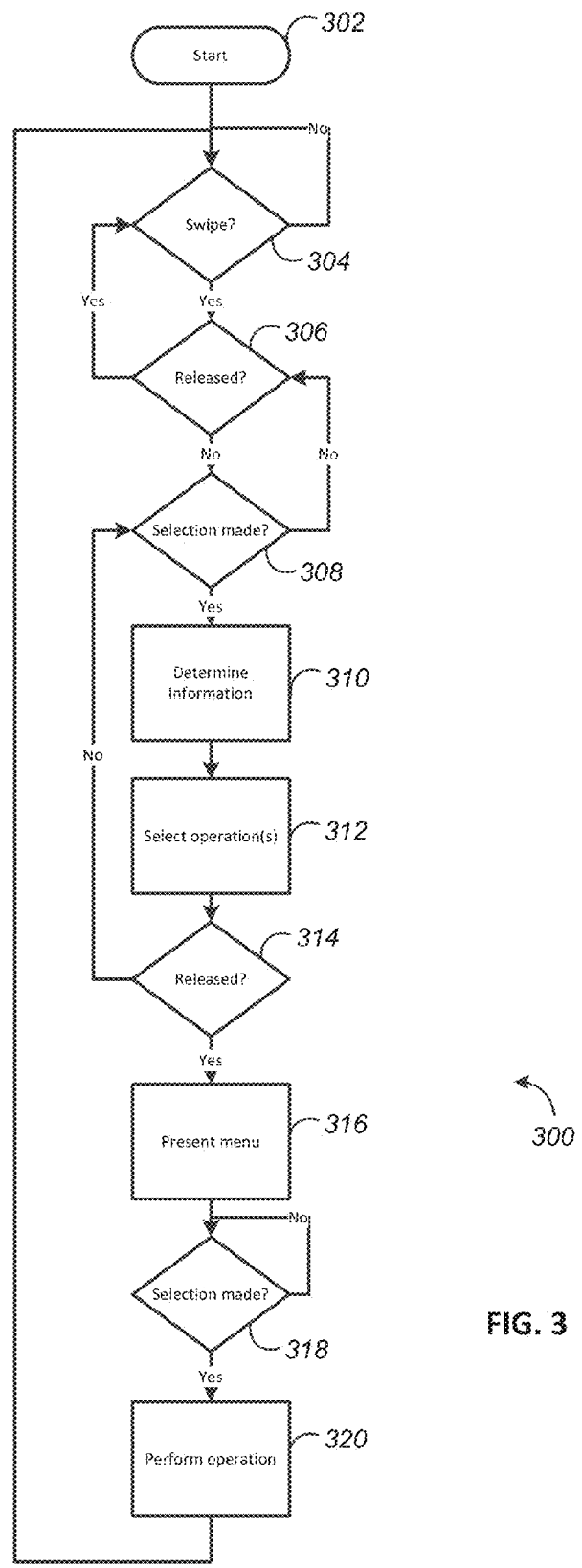
FIG. 3 is a flowchart of an example of a method for managing a selection mode for presented content.

FIG. 3 is a flowchart of an example of a method 300 for managing a selection mode for presented content. The method 300 can be performed by a processor that executes instructions stored in a computer-readable medium. For example, the method 300 can be performed in the system 100 (FIG. 1) and can generate any or all of the touchscreens exemplified in FIGS. 2A-I.

At 302, the method 300 begins. At 304, it is determined whether the user operates a selection activation element, such as by swiping the element 206 as shown in FIG. 2B. If the user is not operating the selection activation element at 304, the determination at 304 can be performed again.

If the user swipes the selection activation element at 304, then at 306 it is determined whether the user has released the element. For example, the release causes the element to change from an expanded state (e.g., as shown in FIG. 2C) into a collapsed state (e.g., as shown in FIG. 2A). If the element is released at 306, then the method 300 can determine, at 304, whether the user swipes the element.

If the user has not released the selection activation element at 306, then at 308 it is determined whether the user has made a selection. For example, any or all of the selection techniques described herein can be used. If the user has not made a selection at 308, the determination at 306 can be performed again.

If the user has made a selection at 308, then at 310 one or more pieces of information is determined. In some implementations, the information will form the context for choosing which operation(s) should be available. For example, any or all of the components 108-116 (FIG. 1) can determine the information.

At 312, one or more operations are chosen to be made available to the user. In some implementations, the choice is done based on the information determined at 310. For example, any or all of the operations corresponding to the operation identifiers 230A-C (FIG. 2I) can be chosen. The chosen operation(s) can be populated into a contextual menu (e.g., the menu 228 in FIG. 2I).

At 314, it is determined whether the user has released the selection activation element. For example, the element can be released from an expanded state (e.g., as shown in FIG. 2C) into a collapsed state (e.g., as shown in FIG. 2A). If the element is not released at 314, then the method 300 can determine, at 308, whether the user makes another selection (e.g., as exemplified in FIG. 2H).

If the element is released at 314, then at 316 a contextual menu can be presented. The menu includes the operation identifier(s) corresponding to the operation(s) selected at 312. For example, the operation identifiers 230A-C (FIG. 2I) can be included.

At 318, it is determined whether the user makes a selection in the presented contextual menu. If the user does not make a selection at 318, the determination at 318 can be performed again.

If the user makes a selection at 318, then at 320 the operation(s) corresponding to the operation(s) selected at 318 can be performed. In some implementations, any or all of operations 118-126 (FIG. 1) can be performed. For example regarding the add content operation 126 (FIG. 1), when the user selects some content that is related to non-selected content, such as an image or a table, the add content operation can propose to the user that some or all of the non-selected content should be included. After performing the operation(s) at 320, the method 300 can again perform the determination at 304.

Figure 4:
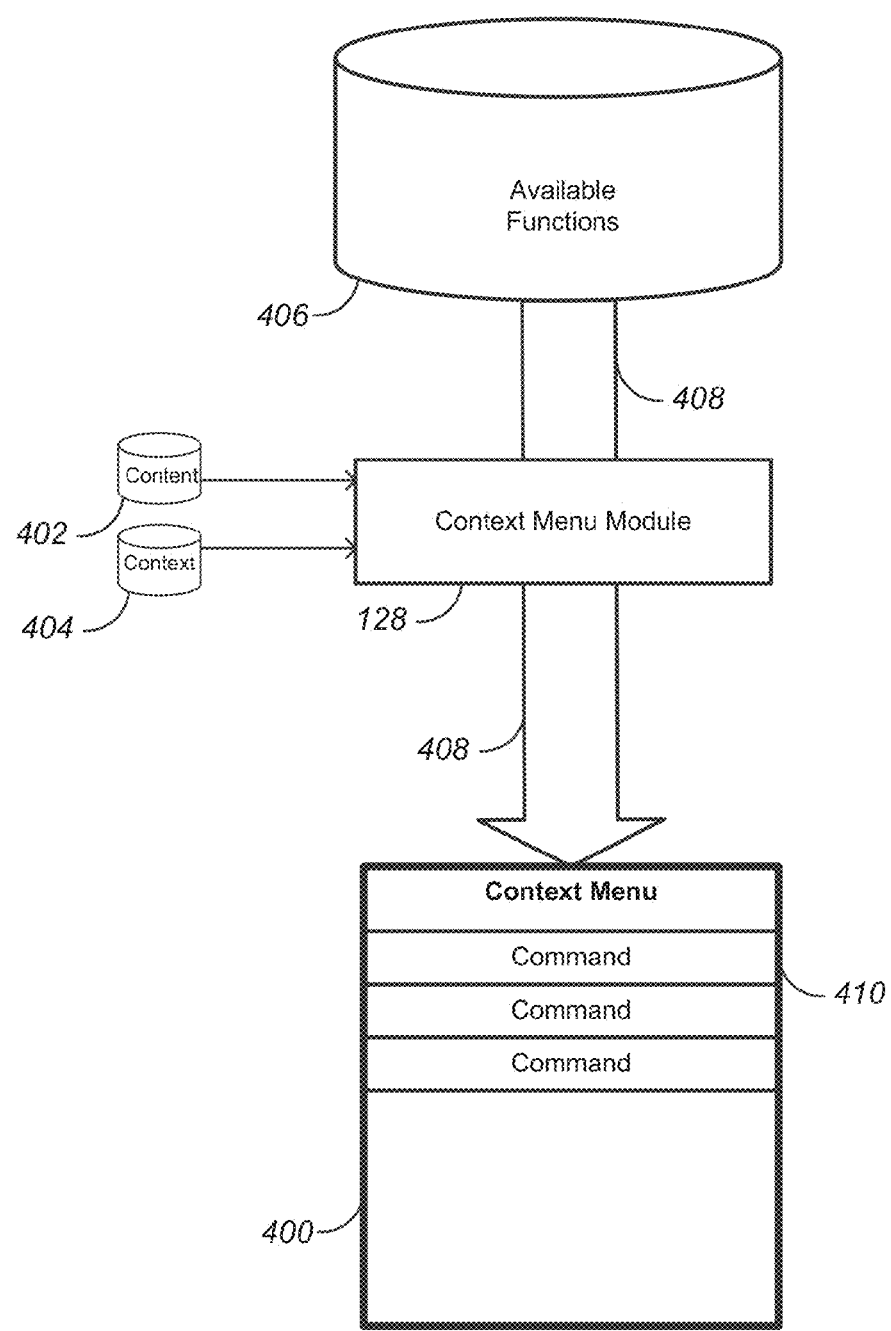
FIG. 4 shows an example of context menu population.

FIG. 4 shows an example of context menu population. When a context menu 400 is presented, it should be populated with functions or other operations that are relevant to the user in that particular situation. Here, the context menu module 128 has access to selected content 402 and context 404 of the selected content, and based thereon can choose the function(s) to be included. For example, after the user has selected the content 402 (e.g., as described above with reference to FIGS. 2A-K), the context menu module 128 seeks to interpret the selected content in terms of one or more aspects or characteristics, and uses this interpretation to make a selection among available functions 406, representing the functions that have been defined for performance in the system. The context menu 128 makes one or more of the available functions 406 accessible to the user by including it/them in the context menu 400, as schematically illustrated by arrow 408. In the context menu, the selected function(s) can be represented as one or more user-selectable menu items 410 (e.g., the operation identifiers 230A-C in FIG. 2I.)

The context 404 of the selected content 402 can be taken into account. In some implementations, suggestions for populating the context menu 400 are made not only by understanding what the content 402 is, but also by understanding the environment or other context in which that content exists. For example, if the user selects content on a portal page that is part of a particular portal role, then the context menu module 128 can identify one or more operations that are defined in the portal for that portal role, and include the operation(s) in the context menu.

The type of the selected content 402 can be taken into account. For example, if a social feeds function is assigned to the user, the context menu module 128 can suggest that the selected content be posted as a feed. As another example, for complex content (e.g., content that has a title, paragraphs, images and/or links), the context menu module can suggest that the user export the content to a pdf document or a word processing document and/or an image file, or that the content be sent as an email. As another example, for content that contains data from a table, the suggestion can be to export the selected content to a graph. As another example, for a selected word or phrase the suggestion can be that the user run one or more searches (e.g., using a private or publicly available search engine.)

In some implementations, the context menu module 128 can do this by interpreting one or more tags or other identifiers in the selected content. For example, if the selected content includes table rows of hypertext markup language (HTML) code, the context menu module can suggest that the content (or part thereof) be exported to a graphing program. As another example, if the selected content includes text or other characters (e.g., a paragraph), the context menu module can suggest that (at least part of) the content be exported to a document.

Metadata of the selected content 402 can be taken into account. For example, if the selected content is at least one word in an HTML document, and the context menu module 128 detects a metadata tag with the author's name, the suggestion to the user can be to run a search for the word(s) and the author's name. As another example, if the selected content is part of a document in a portal, the context menu module can suggest one or more functions based on metadata of the portal.

The role of the user who makes the selection, and/or any capability assigned to that role, can be taken into account. For example, if the user selects a word or a phrase, and the context menu module 128 detects that a portal search provider is available to this user, one or more searches for the selected content can be suggested to the user in the context menu. As another example, if a user who is an administrator for web pages (e.g., such that the user has assigned to him or her an area management role) selects a complete article, then the context menu module can suggest that the selected content be published as a web page.

Figure 5:
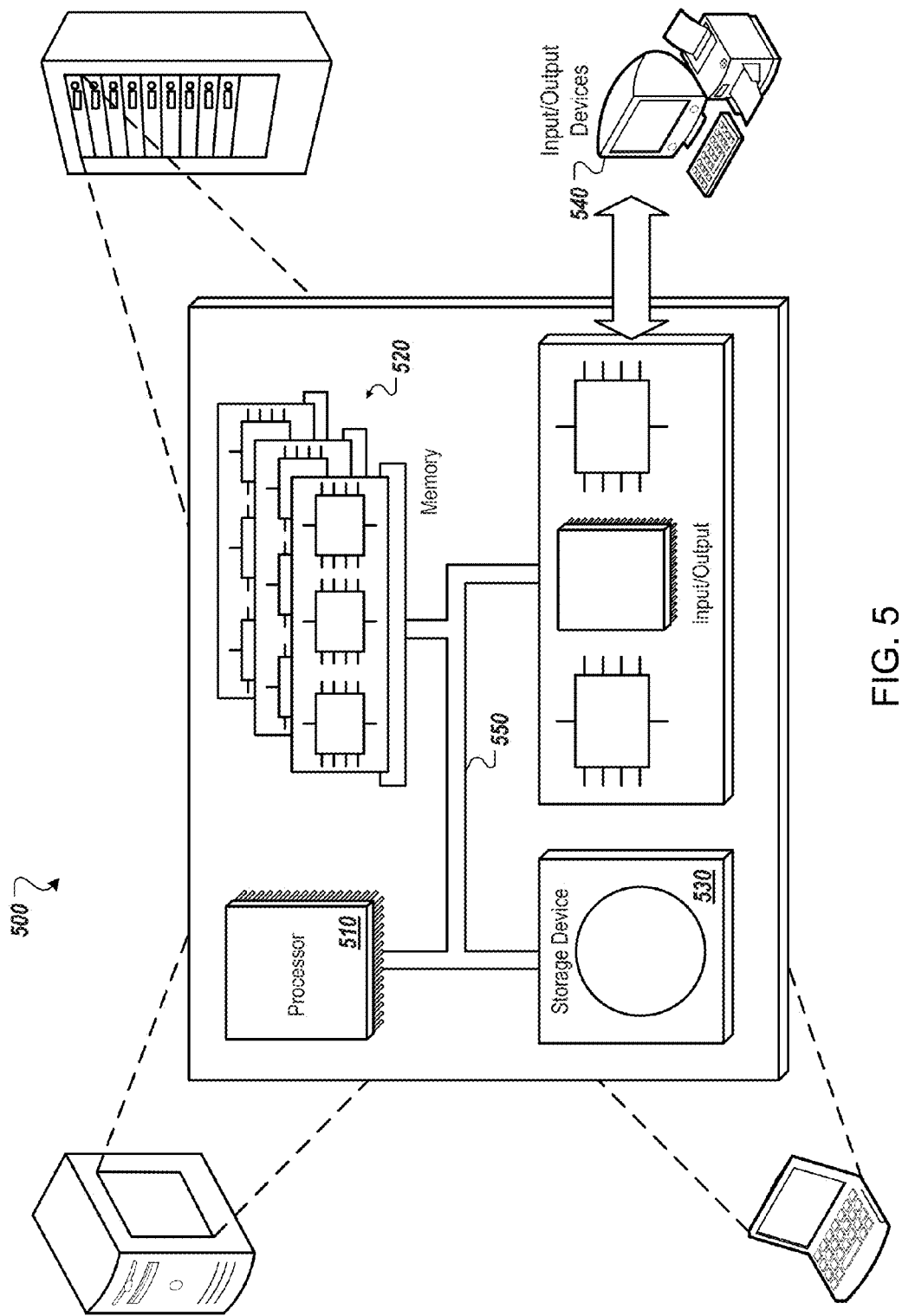
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for managing a selection mode for presented content, the method comprising:
   presenting, on a touchscreen of a device, content and a selection activation element;
   receiving, using the touchscreen, first input generated by a user holding the selection activation element on the touchscreen, the selection activation element located at a first location on the touchscreen;
   in response to the first input, and while the user continues to hold the selection activation element, activating a selection mode on the device;
   after activation of the selection mode, and while the user continues to hold the selection activation element, receiving second input generated by the user selecting at least part of the content on the touchscreen according to the selection mode, the second input different than the first input and received at at least one location different than the first location, wherein the second input includes the user placing two fingers on the touchscreen, and wherein placing the two fingers on the touchscreen selects the at least part of the content defined by a block where the two fingers spans a diagonal of the block by highlighting the at least part of the content;
   determining that the user releases the selection activation element associated with the first input on the touchscreen;
   in response to the determination that the user releases the selection activation element associated with the first input:
      deactivating the selection mode;
      detecting that the at least part of the content selected is part of a relatively larger unit within the content based at least in part on one or more metadata tags associated with the at least part of the content; and
      presenting on the touchscreen a contextual menu with one or more user-selectable operation identifiers based on the one or more metadata tags for the at least part of the content selected by the second input, wherein a first user-selectable operation identifier corresponds to an operation modifying the at least part of the content selected;
   receiving third input generated by the user selecting the first user-selectable operation identifier on the touchscreen, the third input different than the first and second input; and
   in response to the third input, performing an operation corresponding to the selected first user-selectable operation identifier by expanding the highlighted at least part of the content to include the relatively larger unit of which the at least part of content selected is part.

2. The computer-implemented method of claim 1, wherein the selection activation element is presented in a margin of the touchscreen, and wherein the margin of the touchscreen is separated from the at least part of the content on the touchscreen selected by the second input.

3. The computer-implemented method of claim 1, wherein the user swipes the selection activation element from an inactive state to an active state where the selection activation element is larger.

4. The computer-implemented method of claim 1, wherein the selection activation element is presented on the touchscreen in a location reachable with one hand that is holding the device, and wherein the user generates the second input using the other hand.

5. The computer-implemented method of claim 1, wherein the second input corresponds to multiple portions of the content separately selected by the user while holding the selection activation element, and wherein the operation comprises one or more functions performed with regard to the multiple portions.

6. The computer-implemented method of claim 1, wherein the second input comprises at least one of:
   the user swiping a finger along the at least part of the content;
   the user swiping the finger diagonally across the at least part of the content; and
   the user swiping the finger to create a shape on the touchscreen that at least partly includes the at least part of the content.

7. The computer-implemented method of claim 1, wherein the operation identifiers for the selected at least part of the content are determined based on at least one of:
   a context of the at least part of the content;
   meta data of the at least part of the content;
   a type of the at least part of the content;
   an application that presents the at least part of the content; and
   a role of the user.

8. The computer-implemented method of claim 7, wherein the content includes an article and the meta data includes a tag that specifies an author name for the content, and wherein the operation comprises performing a search using the content and the author name.

9. The computer-implemented method of claim 1, wherein the operation is defined in a program, the method further comprising detecting that the program is available to the user, wherein the operation is performed in response to the detection.

10. A computer program product embodied in a non-transitory computer-readable storage medium and comprising instructions that when executed by a processor perform a method for managing a selection mode for presented content, the method comprising:
   presenting, on a touchscreen of a device, content and a selection activation element;
   receiving, using the touchscreen, first input generated by a user holding the selection activation element on the touchscreen;
   in response to the first input, and while the user continues to hold the selection activation element, activating a selection mode on the device;
   after activation of the selection mode, and while the user continues to hold the selection activation element, receiving second input generated by the user selecting at least part of the content on the touchscreen according to the selection mode, the second input different than the first input, wherein the second input includes the user placing two fingers on the touchscreen, and wherein placing the two fingers on the touchscreen selects the at least part of the content defined by a block where the two fingers spans a diagonal of the block by highlighting the at least part of the content;

determining that the user releases the selection activation element associated with the first input on the touchscreen;

in response to the determination that the user releases the selection activation element associated with the first input:

deactivating the selection mode;

detecting that the at least part of the content selected is part of a relatively larger unit within the content based at least in part on one or more metadata tags associated with the at least part of the content; and presenting on the touchscreen a contextual menu for presentation on the touchscreen with one or more user-selectable operation identifiers based on the one or more metadata tags for the at least part of the content selected by the second input, wherein a first user-selectable operation identifier corresponds to an operation modifying the at least part of the content selected;

receiving third input generated by the user selecting the first user-selectable operation identifier on the touchscreen, the third input different than the first and second input; and in response to the third input, performing an operation corresponding to the selected first user-selectable operation identifier by expanding the highlighted at least part of the content to include the relatively larger unit of which the at least part of the content selected is part.

11. The computer program product of claim 10, wherein the selection activation element is presented in a margin of the touchscreen.

12. The computer program product of claim 10, wherein the user swipes the selection activation element from an inactive state to an active state where the selection activation element is larger.

13. The computer program product of claim 10, wherein the selection activation element is presented on the touchscreen in a location reachable with one hand that is holding the device, and wherein the user generates the second input using the other hand.

14. The computer program product of claim 10, wherein the second input corresponds to multiple portions of the content separately selected by the user while holding the selection activation element, and wherein the operation comprises one or more functions performed with regard to the multiple portions.

15. The computer program product of claim 10, wherein the second input comprises at least one of:

the user swiping a finger along the at least part of the content;

the user swiping the finger diagonally across the at least part of the content; and the user swiping the finger to create a shape on the touchscreen that at least partly includes the at least part of the content.

16. The computer program product of claim 10, wherein the operation identifiers for the selected part of the content are determined based on at least one of:

a context of the at least part of the content;

meta data of the at least part of the content;

a type of the at least part of the content;

an application that presents the at least part of the content; and a role of the user.

17. A system comprising:

one or more processors; and a computer program product comprising instructions that when executed perform a method comprising:

presenting, on a touchscreen of a device, content and a selection activation element;

receiving, using the touchscreen, first input generated by a user holding the selection activation element on the touchscreen;

in response to the first input, and while the user continues to hold the selection activation element, activating a selection mode on the device;

after activation of the selection mode, and while the user continues to hold the selection activation element, receiving second input generated by the user selecting at least part of the content on the touchscreen according to the selection mode, the second input different than the first input, wherein the second input includes the user placing two fingers on the touchscreen, and wherein placing the two fingers on the touchscreen selects the at least part of the content defined by a block where the two fingers spans a diagonal of the block by highlighting the at least part of the content;

determining that the user releases the selection activation element associated with the first input on the touchscreen;

in response to the determination that the user releases the selection activation element associated with the first input:

deactivating the selection mode;

detecting that the at least part of the content selected is part of a relatively larger unit within the content based at least in part on one or more metadata tags associated with the at least part of the content; and presenting on the touchscreen a contextual menu with one or more user-selectable operation identifiers based on the one or more metadata tags for the at least part of the content selected by the second input, wherein a first user-selectable operation identifier corresponds to an operation modifying the at least part of the content selected;

receiving third input generated by the user selecting the first user-selectable operation identifier on the touchscreen, the third input different than the first and second input; and in response to the third input, performing an operation corresponding to the selected first user-selectable operation identifier by expanding the highlighted at least part of the content to include the relatively larger unit of which the at least part of the content selected is part.

18. The system of claim 17, wherein the selection activation element is presented in a margin of the touchscreen and wherein the user swipes the selection activation element from an inactive state to an active state where the selection activation element is larger.

19. The system of claim 17, wherein the selection activation element is presented on the touchscreen in a location reachable with one hand that is holding the device, and wherein the user generates the second input using the other hand.

20. The system of claim 17, wherein the second input corresponds to multiple portions of the content separately selected by the user while holding the selection activation element, and wherein the operation comprises one or more functions performed with regard to the multiple portions.

21. The system of claim 17, wherein the second input comprises at least one of:
- the user swiping a finger along the at least part of the content;
- the user swiping the finger diagonally across the at least part of the content; and
- the user swiping the finger to create a shape on the touchscreen that at least partly includes the at least part of the content.

22. The system of claim 17, wherein the operation identifiers for the selected part of the content are determined based on at least one of:
- a context of the at least part of the content;
- meta data of the at least part of the content;
- a type of the at least part of the content;
- an application that presents the at least part of the content; and
- a role of the user.

* * * * *